United States Patent [19]

Zimmermann et al.

[11] Patent Number: 5,680,263
[45] Date of Patent: Oct. 21, 1997

[54] INTERIOR REARVIEW MIRROR FOR MOTOR VEHICLES

[75] Inventors: Werner Zimmermann, Ottenbach; Djuanarto Kusuma, Rödental, both of Germany

[73] Assignee: Reitter & Schefenacker GmbH & Co. KG, Esslingen, Germany

[21] Appl. No.: 497,650

[22] Filed: Jun. 30, 1995

[30] Foreign Application Priority Data

Jul. 1, 1994 [DE] Germany .................. 44 23 134.2

[51] Int. Cl.$^6$ .................. G02B 7/182; G05B 19/02; G08C 17/02
[52] U.S. Cl. .............. 359/872; 340/825.22; 340/825.69; 340/825.72; 341/176; 455/99; 455/151.2; 455/161.2
[58] Field of Search .................. 359/601, 838, 359/871, 872; 340/825.22, 825.69, 825.72, 825.31; 341/176; 455/71, 95, 99, 151.2, 161.1, 161.2

[56] References Cited

U.S. PATENT DOCUMENTS

| | | | |
|---|---|---|---|
| 4,241,870 | 12/1980 | Marcus | 455/99 |
| 4,247,850 | 1/1981 | Marcus | 359/601 |
| 4,447,808 | 5/1984 | Marcus | 340/825.72 |
| 4,930,742 | 6/1990 | Schofield et al. | 359/871 |
| 5,223,814 | 6/1993 | Suman . | |
| 5,455,716 | 10/1995 | Suman et al. | 359/838 |
| 5,469,298 | 11/1995 | Suman et al. | 359/838 |
| 5,479,155 | 12/1995 | Zeinstra et al. | 340/825.22 |

*Primary Examiner*—Ricky D. Shafer
*Attorney, Agent, or Firm*—Robert W. Becker & Associates

[57] ABSTRACT

An interior rearview mirror for motorized vehicle has a mirror support and a mirror housing pivotably connected to the mirror support. A mirror glass is mounted in the mirror housing. A part of a garage door opener is mounted within the mirror housing.

9 Claims, 2 Drawing Sheets

INTERIOR REARVIEW MIRROR FOR MOTOR VEHICLES

BACKGROUND OF THE INVENTION

The present invention relates to an interior rearview mirror for motor vehicles with a mirror support at which a mirror housing is adjustably supported.

Remote-controllable garage doors are known which can be opened or closed from the motor vehicle by means of a hand-held transmitter. The hand-held transmitter is stored inside the motor vehicle and often has to be searched for in the motor vehicle when it is to be used.

It is, therefore, an object of the invention to embody and arrange the garage door opener such that it can be conveniently actuated by the driver.

SUMMARY OF THE INVENTION

An interior rearview mirror for motorized vehicles according to the present invention is primarily characterized by:

a mirror support;

a mirror housing pivotably connected to the mirror support;

a mirror glass mounted in the mirror housing; and a part of a garage door opener positioned within the mirror housing.

The rearview mirror preferably further comprises a receiving member, connected to the mirror housing, for receiving the at least one part of the garage door opener.

Expediently, the receiving member is cap-shaped.

Advantageously, the receiving member is detachably connected to the mirror housing.

The receiving member may preferably be a part of the mirror housing.

The receiving member is transmissive for signals emitted by the garage door opener. Preferably, the signals are radio signals.

The garage door opener is expediently programmable.

The garage door opener advantageously comprises a transmitter and a receiver.

The garage door opener preferably further comprises a microcomputer, and the transmitter and the receiver are connected to the microcomputer.

Expediently, a decoder is connected between the microcomputer and the receiver.

Preferably, an encoder is connected between the microcomputer and the transmitter.

Advantageously, signal lines are provided with which the microcomputer is connected to the transmitter and the receiver for setting the operating signal frequency of the garage door opener.

Expediently, further signal lines are provided with which the microcomputer is connected to the decoder and the encoder for setting a decoding/encoding method.

The object is solved, according to the invention, by providing an interior rearview mirror with at least a part of the garage door opener mounted within the mirror housing.

In order to open or close the garage door, it is not required to carry a hand-held transmitter inside the motor vehicle. The inventive interior rearview mirror of the motor vehicle, instead, provides at least a part of the garage door controller such that it is fixedly mounted within the motor vehicle and cannot be lost. The driver of the vehicle, therefore, does not have to search for the hand-held transmitter first but he can conveniently actuate the fixedly mounted garage door opener, for example, by means of a switch that is installed in the dashboard. Since the garage door opener is mounted within the mirror housing of the interior rearview mirror, it is not required to create an additional mounting space for the garage door opener. Rather, the interior space of the already installed mirror housing of the interior rearview mirror can be utilized. Therefore, an additional mounting space within the motor vehicle is not required.

BRIEF DESCRIPTION OF THE DRAWINGS

The objects and advantages of the present invention will appear more clearly from the following specification in conjunction with the accompanying schematic drawings, in which.

DESCRIPTION OF PREFERRED EMBODIMENTS

Figure 1:
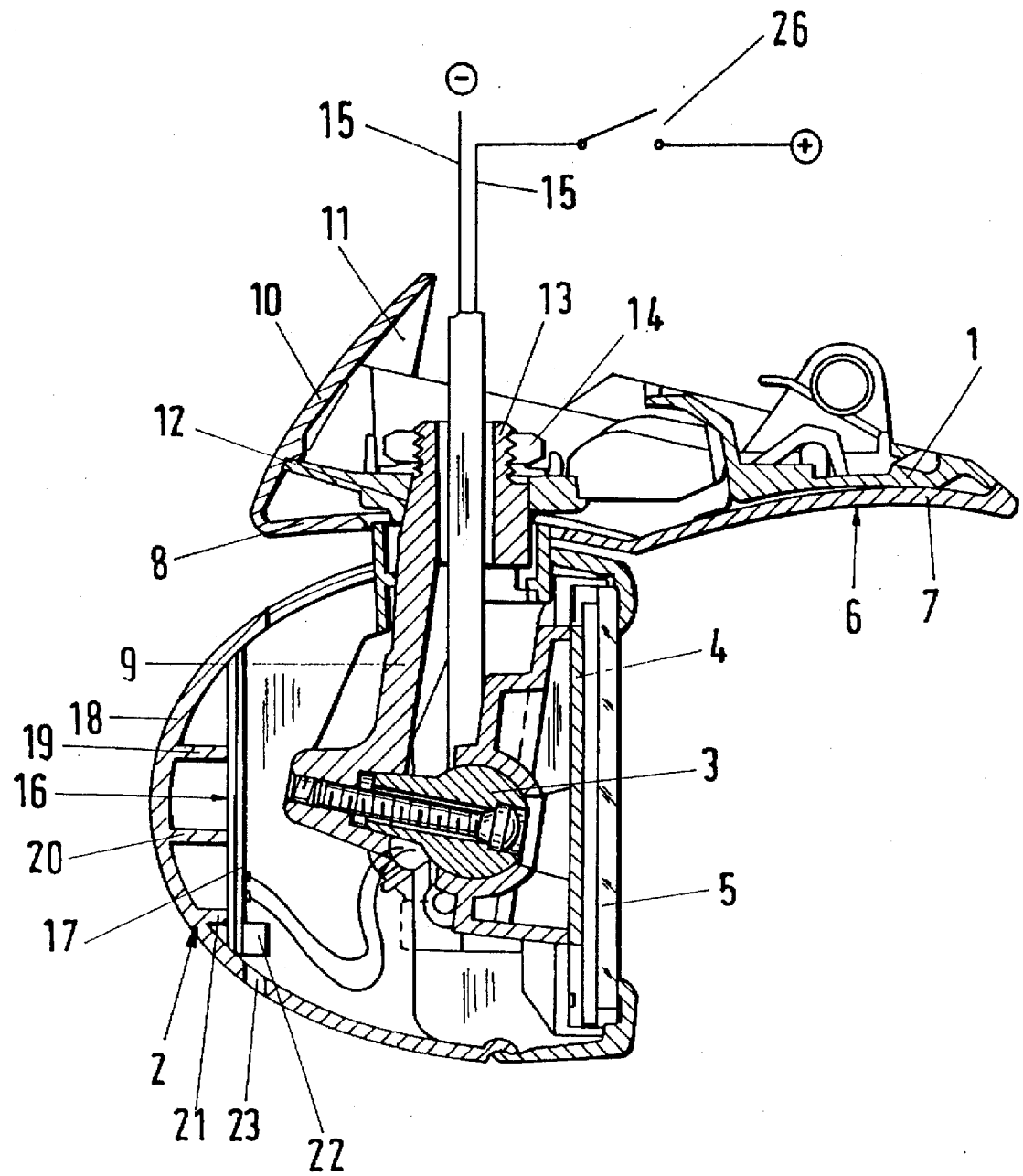
FIG. 1 illustrates a cross-section of an inventive interior rearview mirror.

The interior rearview mirror is provided with a mirror support 1 which is mounted within the motor vehicle in a manner known per se. At the mirror support 1, a mirror housing 2 is pivotably supported by means of a ball-and-socket joint 3. The mirror housing 2 is provided with a mirror glass holder to which a mirror glass 5 is attached.

The mirror support 1 is located above a cover plate 6. The cover plate 6 is provided with a covering portion 7 which has a snap-on connection, preferably at the mirror support 1; the covering portion 7 is shaped as a plate and in convexly curved. Approximately at the level of the mirror housing 2, the covering portion 7 has a transition into a front covering portion 8 which is located in the area above the mirror housing 2 and extends into the direction of the windshield (not illustrated). This front covering portion 8 is penetrated by a holding member 9 on which the mirror housing 2 is mounted via the mirrorglass holder 4 in a manner known per se. In the direction of the windshield, the front covering portion 8 has a transition into an upwardly extending wall portion 10. It extends transversely to the driving direction of the motor vehicle and is provided at its ends with sidewalls 11 which advantageously extend perpendicularly to the plate-shaped wall portion 10.

The holding member 9 penetrates the front covering portion 8 and extends through an opening 12 of the mirror support 1. Onto the thread end 13, protruding the opening 12, of the holding member 9, a nut 14 is screwed by which the holding member 9 can be fixedly connected to the mirror support 1. The opening 12 of the mirror support 1 is provided with a wall that is conically tapered toward the nut 14 and which cooperates with a correspondingly conical outer wall of the holding member 9.

In the area of its thread end 13, the holding member 9 is designed in the shape of a sleeve. Through this portion of the holding member 9, electrical lines 15 are lead into the mirror housing 2. With the aid of the electrical lines 15 and switch 26, a garage door opener 16, positioned within the mirror housing 2 is supplied with electrical power.

The garage door opener has an electrical transmitter 17 which is positioned within the mirror housing 2. The mirror housing 2 is provided with a cap-shaped receiving member 18 which can be detached from the rest of the mirror housing and is provided with stays 19 to 21 which protrude from the inner surface and on which the transmitter 17 rests. The transmitter 17 is, for example, detachably mounted within the receiving member 18 by screws (not illustrated). The receiving member 18 is transmissive for signals from the transmitter such that those signals can reach the receiver at the garage door.

The transmitter 17 is provided with a reset key 22 by which memorized data of the garage door opener 16 can be erased. The reset key 22 can be actuated by a pin or the like which can be inserted through an opening 23 of the mirror housing 2. The reset key 22 cannot be actuated inadvertently since it is located within the mirror housing.

The receiving member 18 is preferably connected detachably to the mirror housing 2 so that it can be simply removed, if necessary. Thus, the receiving member 18 can, for example, be snap-connected to a portion of the mirror housing. The receiving member 18 is designed such that it forms, in conjunction with the remaining housing portions, the complete mirror housing 2. The receiving member 18 is located opposite the mirror glass holder 4 and faces the windshield (not illustrated) of the motor vehicle.

Figure 2:
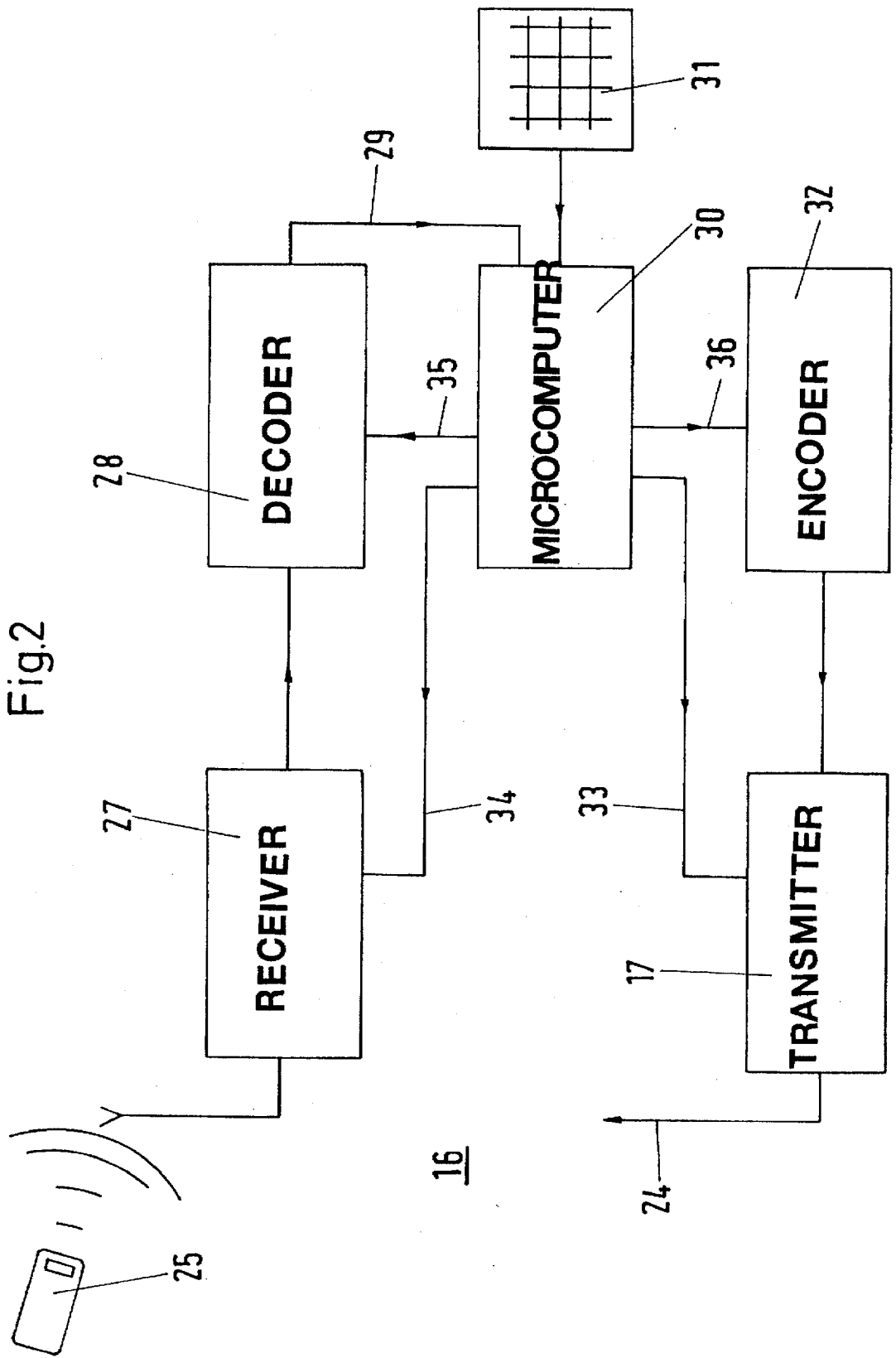
FIG. 2 shows a block diagram of a garage door controller that is located within the interior rearview mirror according to FIG. 1, in a schematic illustration.

The garage door opener 16 will be explained in detail with the help of FIG. 2. It comprises the transmitter 17 which transmits the respective signals 24 if the garage door is to be opened or closed. The garage door opener 16 can be programmed by means of a hand-held transmitter 25 with which the garage door is normally opened or closed in response to the emitted signal. Subsequently, the hand-held transmitter is no longer required for opening or closing the garage door. Rather, a key 22 (FIG. 1) within the vehicle is actuated for activating the transmitter 17 in order to open or close the garage door.

The impulses transmitted by hand-held transmitter 25 are received by a receiver 27 of the garage door controller 16. The receiver transmits a respective low frequency signal which is sent to a decoder 28. The decoder 28 decodes the signal transmitted by the hand transmitter 25 and thus by the receiver 27. The decoded signal 29 is being transmitted to a microcomputer 30 that is programmable by means of a keyboard 31. An encoder 32 is arranged downstream of the micro computer 30 and for encoding and transmitting the respective signal to the transmitter 17.

With the help of the microcomputer 30 it is possible to set the transmitter 17 and the receiver 27 to different frequencies, for example, to 27 MHz, 40 MHz, 433 MHz, and 560 MHz. For this purpose, the microcomputer is connected with the transmitter 17 and the receiver 27 via respective signal lines 33 and 34. By means of the keyboard, the appropriate signals for the respective frequency selection can be fed to the microcomputer 30.

Moreover, it is possible to select or set also different decoding methods with the microcomputer 30. For this purpose, the microcomputer 30 is connected to the decoder 28 and the encoder 32 via respective signal lines 35 and 36. For selecting the respective decoding methods, the respective commands are input to the computer 30 via the keyboard 31.

The garage door opener 16 with the described parts is completely mounted within the mirror housing 2 so that no separate mounting space has to be provided within the motor vehicle. Due to the described options, the garage door opener 16 can be adjusted by the user in a simple way to the different kinds of hand-held transmitters 25. Therefore, it is not necessary to manufacture different garage door openers for different frequencies and codes of the remote control signals. If the user of the motor vehicle installs a new remote-controllable garage door, he can adjust the garage door controller 16 to the new garage door very easily. First all data memorized in the garage door opener 16 are erased by means of the reset key 22. Subsequently, the garage door opener 16 is adjusted with the hand-held transmitter 25 of the new remote-controlled garage door to the desired operating frequency. By means of the keyboard 31, the respectively required frequency and, if necessary, the respectively required decoding/encoding method can be adjusted. Then, the hand-held transmitter 25 is pointed at the receiver 27 and is actuated. Those remote control signals of the hand-held transmitter 25 which have been received by the receiver 27 are transmitted to the transmitter 17 in the described manner and are memorized there. The transmitter 17 is provided with a respective memory. By actuating the key 22, the transmitter 17 can now be activated for transmitting the respective remote control signals for opening or closing the garage door.

The receiver 27 can be mounted within the receiving member 18 of the mirror housing 2. However, any other location within the mirror housing is possible for the receiver 27. The receiver 27 has to be arranged such that the signals transmitted from the hand-held transmitter 25 can reach the receiver 27. Therefore, the receiver 27 can also be mounted at the outer surface of the mirror housing 2. The key 27 by which the garage door controller 16 is actuated inside the motor vehicle is advantageously positioned within the motor vehicle such that it can be actuated conveniently by the driver.

The present invention is, of course, in no way restricted to the specific disclosure of the specification and drawings, but also encompasses any modifications within the scope of the appended claims.

What we claim is:

1. An interior rearview mirror for motorized vehicles, said rearview mirror comprising:
    a mirror support;
    a mirror housing pivotably connected to said mirror support;
    said mirror housing comprising a housing portion, a mirrorglass holder connected to said housing portion and a cap-shaped receiving member detachably connected to said housing portion opposite said mirrorglass holder;
    said receiving member completing said housing portion and said mirrorglass holder to form said mirror housing;
    a mirror glass mounted in said mirrorglass holder of said mirror housing;
    a garage door opener positioned within said receiving member of said mirror housing; and
    said receiving member being transmissive to signals emitted by said garage door opener.

2. A rearview mirror according to claim 1, wherein said signals are radio signals.

3. A rearview mirror according to claim 1, wherein said garage door opener is programmable.

4. A rearview mirror according to claim 1, wherein said garage door opener comprises a transmitter and a receiver.

5. An interior rearview mirror for motorized vehicles, said rearview mirror comprising:
    a mirror support;
    a mirror housing pivotably connected to said mirror support;
    said mirror housing comprising a housing portion, a mirrorglass holder connected to said housing portion and a cap-shaped receiving member detachably connected to said housing portion opposite said mirrorglass holder;

said receiving member completing said housing portion and said mirrorglass holder to form said mirror housing;

a mirror glass mounted in said mirrorglass holder of said mirror housing;

a garage door opener positioned within said receiving member of said mirror housing;

wherein said garage door opener comprises a transmitter and a receiver, said receiving member being transmissive to signals emitted by said garage door opener; and wherein said garage door opener further comprises a microcomputer and wherein said transmitter and said receiver are connected to said microcomputer.

6. A rearview mirror according to claim 5, further comprising a decoder connected between said microcomputer and said receiver.

7. A rearview mirror according to claim 5, further comprising an encoder connected between said microcomputer and said transmitter.

8. A rearview mirror according to claim 5, further comprising signal lines with which said microcomputer is connected to said transmitter and said receiver for setting the operating signal frequency of said garage door opener.

9. A rearview mirror according to claim 5, further comprising:

a decoder connected between said microcomputer and said receiver;

an encoder connected between said microcomputer and said transmitter;

signal lines with which said microcomputer is connected to said decoder and said encoder for controlling said decoder and said encoder.

\* \* \* \* \*